No. 775,910. Patented November 29, 1904.

UNITED STATES PATENT OFFICE.

CHARLES A. BACKSTROM, OF MILWAUKEE, WISCONSIN.

TURBINE-SHAFT PACKING.

SPECIFICATION forming part of Letters Patent No. 775,910, dated November 29, 1904.

Application filed April 1, 1904. Serial No. 201,037. (No model.)

*To all whom it may concern:*

Be it known that I, CHARLES A. BACKSTROM, a citizen of the United States, residing at Milwaukee, county of Milwaukee, and State of Wisconsin, have invented new and useful Improvements in Turbine-Shaft Packing, of which the following is a specification.

My invention relates to improvements in turbines.

The object of my invention is to provide means for preventing the escape of motive fluid through the shaft-aperture in the turbine-head, the ordinary packing used for this purpose being found insufficient to prevent material leakage.

In the following description reference is had to the accompanying drawings, in which—

Figure 1 is a detail view showing a turbine-head and end running-wheel in axial section. Fig. 2 is a sectional view drawn on line $x\,x$ of Fig. 1. Fig. 3 is a sectional view drawn on line $y\,y$ of Fig. 1.

Like parts are identified by the same reference characters throughout the several views.

1 is the outer casing of the turbine, 2 is the shaft, and 3 a running-wheel provided with peripheral vanes 4.

5 is the nozzle-ring, encircling the running-wheel and vanes and provided with nozzles 6 for the delivery of motive fluid to the vanes from an initial fluid-supply chamber 8.

9 is a valve-ring supported from the nozzle-ring by rollers 10, and 12 is a turbine-head. The construction of the running-wheel, nozzle-ring, and valve-ring have been fully set forth and described in former applications and are not claimed herein. For the purpose of this application, therefore, these parts may be considered to be of any ordinary construction suitable for the purpose.

The running-wheel is provided with a hub 15, which is keyed to the shaft 2 at 16 and projects through the shaft-aperture of the turbine-head 12 and a hub 18, with which the latter is provided. The running-wheel hub 15 is provided with a set of annular outwardly-extending projections 20, forming channels 21 between them, and a packing-sleeve 22 is interposed between the hub 15 and the wall of the aperture through the head 12 and its hub 18. This packing-ring 22 is provided with inwardly-extending projections 23, which are entered in the channels 21 of the running-wheel hub. A sleeve-nut 25 is screwed into the outer end of the hub 18 and pushes the packing-sleeve 22 inwardly until the ribs 23 of the sleeve are brought into side contact with the ribs 20 of the running-wheel hub, the contacting surfaces being faced off and forming substantially tight joints.

It will be observed that the channels 21 between the ribs 23 of the packing-sleeve are of a sufficient depth to provide space between each rib 20 and the base of its corresponding channel, similar spaces being provided between the ribs 23 and the bases of the channels 21. The sleeve-nut 25 is turned inward from time to time if material leakage is observed.

The shaft is preferably provided with a ring 28, and a packing-ring 29 is seated in a suitable channel in said ring 28 and bears against the inner face of the sleeve-nut 25. Water is admitted to the space between the packing-ring 28 and the outer end of the running-wheel hub 15 through a pipe 33 and passes out through a pipe 30, leading to a suitable point of discharge, the nut 25 being suitably apertured, as indicated at 31. Any steam escaping past the packing-sleeve is condensed by the water in said space.

While I have shown and described the hub 15 as a part of the initial running-wheel of the turbine, it will be understood that it may, if desired, be formed independently and separately secured to the shaft.

Having thus described my invention, what I claim as new, and desire to secure by Letters Patent, is—

1. In a turbine, the combination with a turbine-head provided with a shaft-aperture and a shaft extending through said aperture; of a hub mounted on the shaft and provided with annular outwardly-extending projections; a sleeve encircling said hub and provided with inwardly-extending annular projections in the spaces between the hub projections; and means for adjusting said sleeve to bring its projections into side contact with the projections of the hub.

2. In a turbine, the combination with a turbine-head provided with a shaft-aperture and a shaft extending through said aperture; of a hub fixed on the shaft and provided with outwardly-extending annular projections; a packing-sleeve fitting the aperture in the turbine-head and provided with inwardly-extending annular projections entering the spaces between the hub projections; and a sleeve-nut having screw-threaded engagement with the turbine-head and arranged with its inner end abutting said packing-sleeve.

3. In a turbine, the combination with a turbine-head provided with a shaft-aperture and a shaft extending through said aperture; of a hub fixed on the shaft and provided with outwardly-extending annular projections; a packing-sleeve fitting the aperture in the turbine-head and provided with inwardly-extending annular projections entering the spaces between the hub projections; and a sleeve-nut having screw-threaded engagement with the turbine-head and arranged with its inner end abutting said packing-sleeve; said sleeve being adapted to be adjusted to push the packing-sleeve projections into side contact with the hub projections.

4. In a turbine, the combination with a turbine-head provided with a shaft-aperture and a shaft extending through said aperture; of a hub fixed on the shaft and provided with outwardly-extending annular projections; a packing-sleeve fitting the aperture in the turbine-head and provided with inwardly-extending annular projections entering the spaces between the hub projections; and a sleeve-nut having screw-threaded engagement with the turbine-head and arranged with its inner end abutting said packing-sleeve; together with a ring mounted on the shaft and having packing interposed between it and said sleeve-nut.

5. In a turbine, the combination with a turbine-head provided with a shaft-aperture and a shaft extending through said aperture; of a hub fixed on the shaft and provided with outwardly-extending annular projections; a packing-sleeve fitting the aperture in the turbine-head and provided with inwardly-extending annular projections entering the spaces between the hub projections; and a sleeve-nut having screw-threaded engagement with the turbine-head and arranged with its inner end abutting said packing-sleeve; together with a ring mounted on the shaft and having packing interposed between it and said sleeve-nut; and said sleeve-nut being provided with a drip-aperture between the packing and its inner end.

6. In a turbine, the combination with a turbine-head provided with a central hub having a shaft-aperture and the shaft extending through said aperture, of a running-wheel fixed on the shaft and provided with a hub extending into said shaft-aperture; a packing-sleeve fitting said shaft-aperture and provided with annular inwardly-extending projections entered in suitable channels in said hub; and means for adjusting the packing-sleeve with its projections each in side contact with one wall of its respective channel.

In testimony whereof I affix my signature in the presence of two witnesses.

CHARLES A. BACKSTROM.

Witnesses:
   JAS. B. ERWIN,
   LEVERETT C. WHEELER.